Patented Aug. 16, 1927.

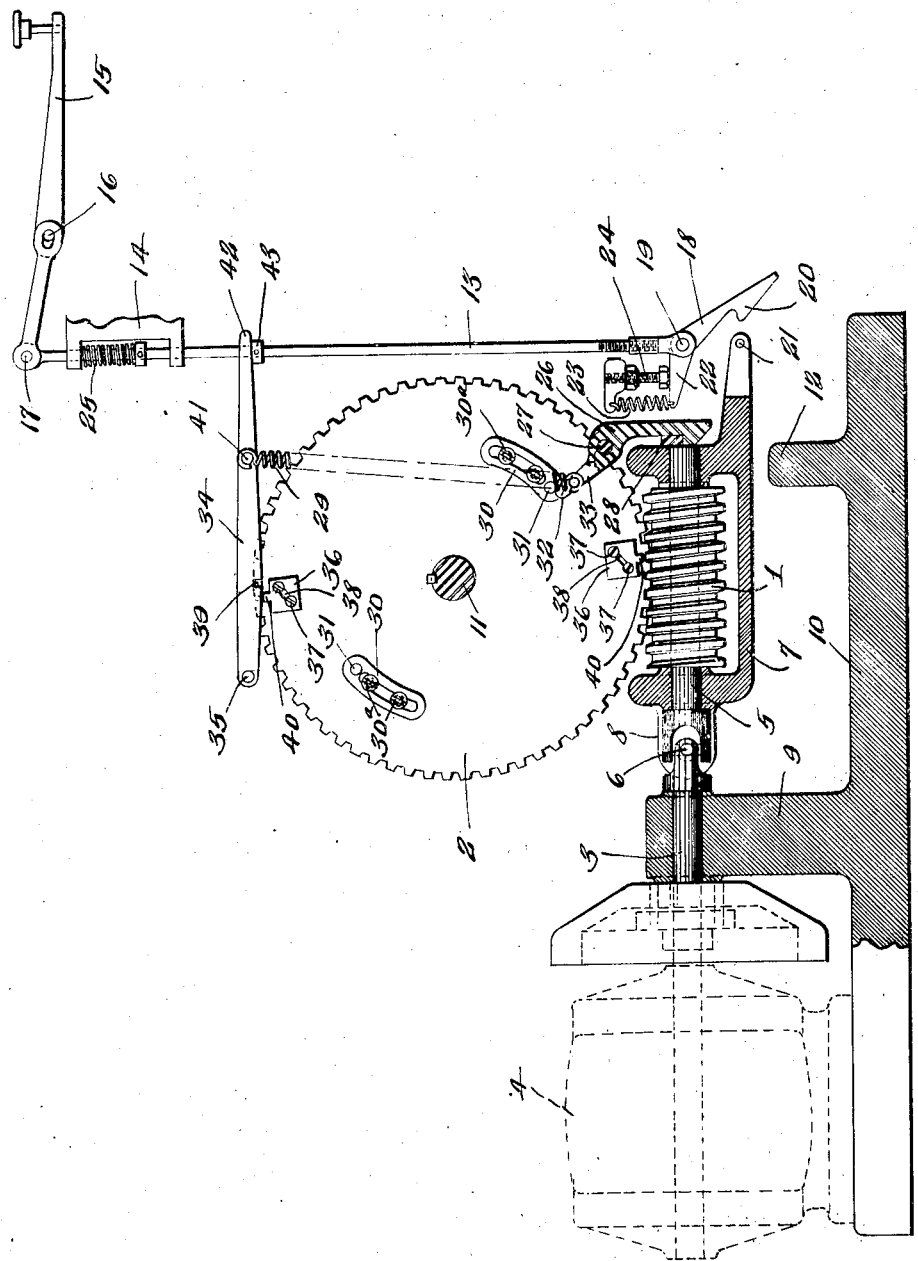

1,639,428

UNITED STATES PATENT OFFICE.

JOSEPH P. DALY, OF SYRACUSE, NEW YORK, ASSIGNOR, BY MESNE ASSIGNMENTS, TO THE PROSPERITY COMPANY, INC., A CORPORATION OF NEW YORK.

MOTION-TRANSMITTING MECHANISM.

Application filed May 9, 1924. Serial No. 712,047.

This invention has for its object a particularly simple and efficient motion transmitting mechanism for effecting a periodic or intermittent motion, which mechanism is particularly simple in construction, economical in manufacture and highly efficient and durable in use, and which consists in of but few compactly arranged parts.

The invention consists in the novel features and in the combinations and constructions hereinafter set forth and claimed.

In describing this invention reference is had to the accompanying drawing which is a sectional view of a motion transmitting mechanism embodying my invention.

This motion transmitting mechanism comprises generally driving and driven elements, one of which, as the driving element, is shiftable into and out of engagement with the other, operator-operated means, or what for convenience will be hereinafter called manual means, for shifting the shiftable or driving element into engagement with the other or driven element, a holding member, for holding the driving element engaged with the driven element, and a tripping device associated with the driven element and operable to automatically release the holding member when the driving element has made a predetermined rotation.

The invention also may include a lock for holding the driven element from movement when disengaged from the driving element.

As here illustrated the driving and driven elements comprise respectively a worm 1, and a worm gear 2. The driving element also includes a rotating shaft 3, as the shaft of an electric motor 4, and the shaft 5 upon which the worm 1 is mounted, the shaft 5 being connected to the shaft 3 by a universal joint 6 of any suitable construction. The worm 1 of the shaft 5 thereof is mounted on a suitable carrier 7, movable for shifting the worm into and out of mesh with the worm gear 2. This carrier is shown as provided with brackets as 8, on opposite sides of the universal joint 6, the brackets being pivoted to any fixed point on an axis passing transversely through the center of the universal joint 6. The shaft 3 is journaled in suitable bearings, and, as here shown, is journaled at its end adjacent the shaft 5 in a bearing formed in an upright 9 rising from a base 10.

The worm gear 2 is mounted upon a suitable shaft 11, which is connected to the mechanism to be intermittently or periodically actuated. The carrier 7 preferably moves by gravity to carry the worm 1 out of engagement with the worm gear 2, and normally resting upon a shoulder 12 rising from the base 10.

The manual or operator-operated means for shifting the carrier 7 to carry the worm 1 into engagement with the worm 2, as here illustrated, comprises a reciprocably movable part or rod 13 slidable in suitable guides formed in a fixed bracket 14, a handle lever 15 pivoted between its ends at 16 to any fixed point, on the frame of the machine equipped with this mechanism, one end of the lever being pivoted at 17 to the upper end of the rod 13, and an engaging member at the end of the rod 13 remote from the handle for engaging the carrier. 7. This engaging member 18 usually comprises what for convenience is called herein, a latch, pivoted at 19 to the lower end of the rod and having a head 20 for engaging a pin 21 at the end of the carrier 7 remote from its pivoted end. The latch has an arm 22 to which is connected a spring 23, tending to move the latch 18 into its operative position. An adjustable knock-off device 24, is arranged in the path of the arm 22, and engages the arm 22 when the carrier has been shifted far enough to carry the worm 1 into mesh with the worm gear 2 and shifts the latch out of engagement with the carrier. The movement of the handle lever 15 shifts the worm 1 into mesh with the worm gear 2 against the action of a suitable returning spring 25.

The means for holding the carrier 7 with the worm 1 in mesh with the worm gear 2, comprises a holding member called for convenience, a latch 26 pivoted at 27 to any fixed point and having a head arranged to ratchet into engagement with a shoulder 28 on the carrier 7, when the carrier has been shifted to carry the worm into mesh with the worm gear, the latch being movable into its operative position by a spring 29.

The means for tripping the latch after the worm gear 2 has been driven a predetermined amount, and thus permit the worm to move by gravity out of mesh with the worm gear, comprises one or more tripping devices 30, having shoulders as pins 31, extending laterally therefrom into the path of a shoulder 32 on the arm 33 of the latch 26. The mechanism here shown is to effect a half revolution, and therefore there are two tripping devices 30 arranged on the worm wheel 2 diametrically opposite each other. For effecting a precise adjustment, each tripping device is adjustably mounted on the worm wheel 2, and as here illustrated is formed with a lengthwise slot for receiving screws 30ª by which the device is secured to the gear 2.

The means for locking the worm gear 2 from turning when the worm 1 is out of mesh therewith comprises a spring pressed locking member 34, here illustrated as a lever pivoted at 35 to a fixed point, and coacting with one or more lock devices 36 on the worm gear 2. As the worm gear in this embodiment of my invention is mounted to make a half revolution during each operation, there are two locking devices 36 arranged diametrically opposite each other. These devices are adjustably mounted upon the worm gear by screws 37 extending through slots 38 in said devices 36. The lock lever 34 and devices 36 are provided with coacting teeth and notches and as illustrated the lever 34 is formed with notches 39 and each device 36 is formed with a tooth 40 for entering the notch when the tooth becomes alined with the notch. The lever 34 is spring pressed and for convenience the spring 29 which acts on the latch 26 is connected at one end to the latch 26 and at its other end at 41 to a lever 34. The lever 34 is connected to the manual means to be shifted out of its operative position when the manual means is operated to shift the worm 1 into engagement with the worm gear 2, and usually the lever 34 is provided with a fork 42 embracing the rod 14 and the rod is formed with a shoulder 43 coacting with the fork.

In operation the spring 25 normally tends to press the rod 13 downwardly and hold the latch 20 under the shoulder 21 of the carrier 7. Upon depression of the handle lever 15 the rod 13 is moved upwardly against the tension of the spring 25 causing the shoulder 43 to operate the locking lever 34 and disengage it from one or the other locking devices 36. Such upward movement of the rod 13 also causes the latch 18 to shift the carrier 7 up against its weight and carry the worm 1 into mesh with the worm wheel 2. After the worm 1 comes in mesh with the worm wheel 2 the latch 26 latches under the shoulder 28 on the carrier 7 and holds the worm in mesh with the worm wheel. As the worm is constantly rotating, the worm gear will be rotated until one or the other of the tripping devices 30 engages and trips the latch 26 and thus permits the carrier 7 to move downwardly by gravity and carry the worm 1 out of mesh with the worm wheel 2. In the drawing the parts are shown in their positions occupied just prior to tripping of the latch, that is, just prior to the completion of the half revolution, and the handle lever 15, rod 13, and the latch 18 are shown as in their positions occupied when the operator holds the hand lever depressed.

After the operator has depressed the handle 15 and the latch 26 has engaged the shoulder 28 on the carrier 7, the arm 22 of the latch 18 engages the knock-off shoulder 24 and moves the latch out of engagement with the carrier 7, as shown in the drawing. Thus if the operator keeps his hand on the handle lever 15, the latch 18 will be moved out of engagement with the carrier 7, and will not prevent the worm from disengaging from the worm wheel 2, when the latch 26 is tripped. Hence upon each operation of the handle 15 the worm wheel 2 will make but a half revolution and will not repeat if the operator holds the hand lever 15 depressed. After the worm wheel completes its half revolution one or other of the locking devices 36 comes into alinement with the notch 39 of the locking lever permitting the locking lever to be moved by its spring 29 into engagement with the locking device 36, if the operator is not holding down the handle 15.

This motion transmitting mechanism is particularly advantageous in that it consists of but a few compactly arranged parts. It is particularly adaptable for opening and closing of press heads of power actuated pressing machines such as garment and laundry pressing machines.

What I claim is:

1. A motion transmitting mechanism, comprising driving and driven elements, the driving element including a worm, and the driven element including a worm gear for meshing with the worm, a carrier for the worm shiftable to carry the worm into and out of mesh with the worm gear, manual means for shifting the carrier to carry the worm into mesh with the worm gear, a holding member for holding the carrier with the worm engaged with the worm gear, means for releasing the holding member, the manual means comprising a connecting member and means for operating the connecting member to disengage the manual means from the carrier after the holding means is operatively engaged with the carrier.

2. A motion transmitting mechanism, comprising driving and driven elements, the driving element including a worm, and the driven element including a worm gear for meshing with the worm, a carrier for the worm, shiftable to carry the worm into and out of mesh with the worm gear, manual means for shifting the carrier to carry the worm into mesh with the worm gear, a holding member for holding the carrier with the worm engaged with the worm gear, means for releasing the holding member, the manual means comprising a reciprocably movable part, a latch carried by said part, and normally arranged to connect with the carrier when said part is operated, and means arranged to move the latch out of connection with the carrier after the holding means has engaged said carrier to hold the worm engaged with the worm gear.

3. A motion transmitting mechanism, comprising driving and driven elements, the driving element including a worm, and a driven element including a worm gear for meshing with the worm, a carrier for the worm, shiftable to carry the worm into and out of mesh with the worm gear, manual means for shifting the carrier to carry the worm into mesh with the worm gear, a holding member for holding the carrier with the worm engaged with the worm gear, means for releasing the holding member, the manual means comprising a reciprocably movable part, a latch pivoted to said part and normally arranged to connect with the carrier upon operation of said part, and a knock-off shoulder coacting with the latch and arranged to move the latch out of connection with the carrier after the holding member has engaged with the carrier.

4. In a transmitting mechanism, the combination of driving and driven elements, the driving element comprising a worm, and the driven element a worm gear, the worm being mounted to shift into and out of engagement with the worm gear, means for shifting the worm into engagement with the worm gear, means associated with the worm gear for controlling the shifting of the worm out of engagement with the worm gear, and a locking means for locking the worm gear from movement after the worm has been shifted out of engagement with the worm gear.

5. In a transmitting mechanism, the combination of driving and driven elements, the driving element comprising a worm, and the driven element a worm gear, the worm being mounted to shift into and out of engagement with the worm gear, manual means for shifting the worm into engagement with the worm gear, means associated with the worm gear for controlling the shifting of the worm out of engagement with the worm gear, and a locking means for locking the worm gear from movement after the worm has been shifted out of engagement with the worm gear, the locking means being connected to the manual means to be shifted thereby out of its operative position upon the operation of the manual means.

6. In a motion transmitting mechanism, the combination of driving and driven elements, the driving element comprising a worm, the driven element a worm gear for meshing with the worm, the worm being mounted to shift into and out of engagement with the worm gear, a carrier for said worm, manual means coacting with the carrier to shift the worm into engagement with the worm gear, a latch operable to hold the carrier with the worm engaged with the worm gear, a device mounted on the worm gear for engaging the latch to trip the same, after the worm gear has been driven a predetermined distance, a spring pressed lock coacting with the worm to normally hold it from movement, the gear having means for coacting with the lock at predetermined points, and a connection between the lock and the manual means for operating the lock to disengage the gear when the manual means is operated to shift the worm.

In testimony whereof, I have hereunto signed my name, at Syracuse, in the county of Onondaga, and in the State of New York, this 28th day of April, 1924.

JOSEPH P. DALY.